Dec. 25, 1934.  P. FABER  1,985,773
CONTROL SYSTEM FOR PRIME MOVERS
Filed Dec. 30, 1930   2 Sheets-Sheet 1

Inventor
Paul Faber
By (signature)
Attorney

Dec. 25, 1934.   P. FABER   1,985,773
CONTROL SYSTEM FOR PRIME MOVERS
Filed Dec. 30, 1930   2 Sheets-Sheet 2

Inventor
Paul Faber
By
Attorney

Patented Dec. 25, 1934

1,985,773

UNITED STATES PATENT OFFICE 1,985,773

CONTROL SYSTEM FOR PRIME MOVERS

Paul Faber, Baden, Switzerland, assignor to Aktiengesellschaft Brown, Boveri & Cie., Baden, Switzerland, a joint-stock company of Switzerland Application December 30, 1930, Serial No. 505,614
In Germany December 30, 1929

5 Claims. (Cl. 137—158)

This invention relates to improvements in steam turbine starting and control systems and particularly to governing systems operated by oil pressure supplied from a pump driven by the turbine.

The speed of steam turbines is controlled by a speed governor usually operated on the centrifugal principle and controlling the position of the steam inlet valves by varying the amount of oil under pressure supplied to the operating means for such valves. Each turbine is also generally provided with a safety speed regulator or emergency governor which shuts the steam supply off completely provided the turbine speed increases beyond the normal limits due either to failure of the speed governor to operate or to failure of operation of the valves usually operated by the steam governor.

The valve controlled by the safety regulator is usually a single seated valve or a valve on which the contra-acting forces are not in equilibrium so that the valve is pressed down on its seat by steam pressure thereon. Such pressure must be overcome to permit opening of the valve and continued operation of the turbine, and may be accomplished by the use of a piston operated by a fluid, such as oil, under pressure. When the forces acting on the closed valve are not balanced, the piston used to operate the valve must be of excessive size or the pressure supplied thereto must exceed practical limits. The unbalanced valve-seat pressure may be avoided by providing bypass valves by which the pressures on both sides of the valves may be equalized.

It is, therefore, among the objects of the present invention to provide a turbine valve governing system in which the pressures acting on the valve may be equalized.

Another object of the invention is to provide a turbine valve governing system having a main and regulating valves in which the regulating valves remain closed until the forces acting on the main valve are equalized.

Another object of the invention is to provide a turbine valve governing system in which the valves are operated in a predetermined sequence of operation.

Another object of the invention is to provide a turbine valve governing system having a main and regulating valves in which the regulating valves are opened only after the main valve has been opened.

Another object of the invention is to provide a turbine valve regulating system having a main and regulating valves in which a starting device controls the sequence of operation of the valves by a single movement.

Another object of the invention is to provide a turbine valve governing system in which the starting device controlling the opening of the valves may be manually operated to cause a quick closing of the valves to bring the turbine to standstill.

Another object of the invention is to provide a turbine valve governing system in which a starting device and an emergency governor cooperate to cause the quick closing of all the valves automatically.

Objects and advantages, other than those above set forth, will be apparent from the following description when read in connection with the accompanying drawings in which Figure 1 is a partial view of a turbine installation showing the material portions of an oil-pressure-actuated governing system, embodying the present invention, in vertical cross-section;

Figure 1:
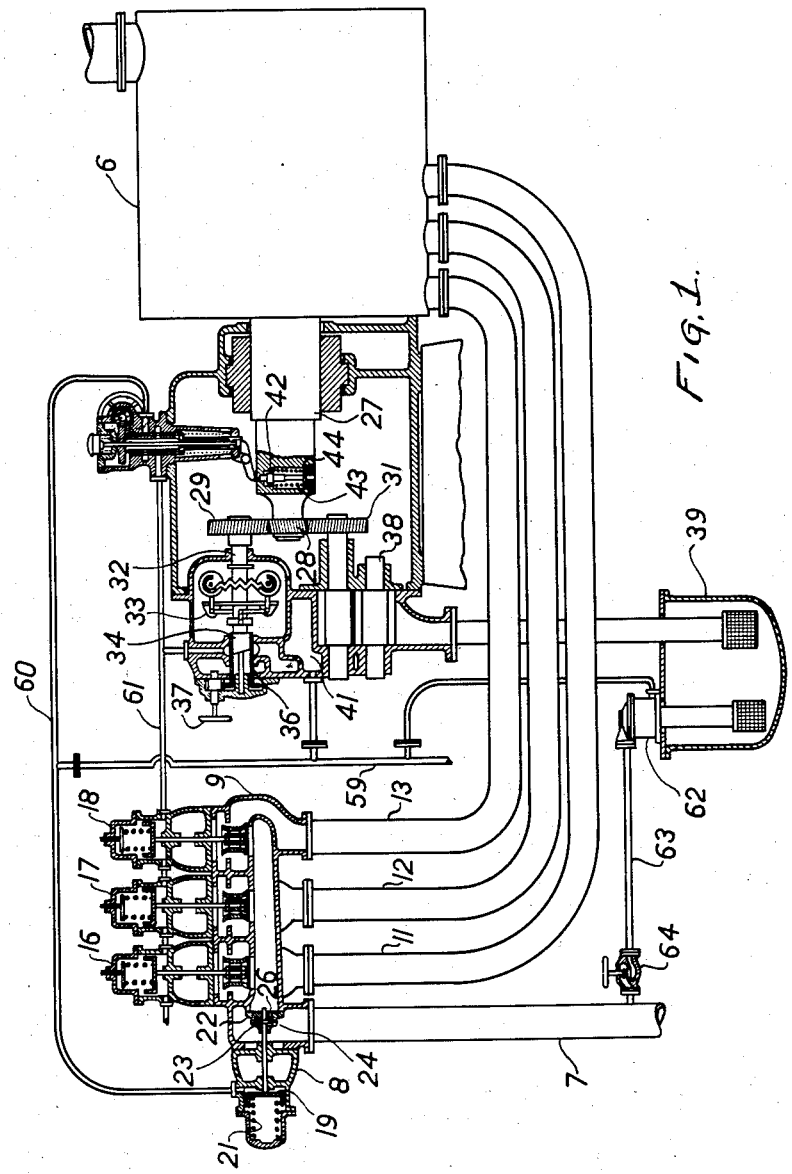

Referring more particularly to the drawings by characters of reference, reference numeral 6 designates a turbine which is supplied with steam from a suitable source (not shown) through a pipe line 7. The line 7 discharges through a main valve indicated generally at 8 into a steam chest 9 from which the steam is distributed to the several inlet ports of the turbine through pipe lines 11, 12 and 13 controlled by valves 16, 17 and 18.

The valve 8 is shown as being of the single seat type which is opened by the application of fluid pressure under a piston 19, as will be described hereinafter, and is closed, upon decrease of the fluid pressure, by the action of a spring 21 compressed between the piston and the valve housing. The body 22 of the valve 8 is not secured rigidly to the valve stem, but the valve stem is formed with a collar or disc 23 moving in a recess in the valve body 22 for the purpose of permitting or preventing the flow of steam through ports 24 and 26 into steam chest 9 from supply line 7. Due to the possibility of a slight movement of the valve stem and its collar 23 within the recess, before movement of the valve body itself, the steam pressure acting on both sides of the valve body is equalized by the admission of steam through ports 24 and 26 into the steam chest before the movement of piston 19 is effective on the main valve 22.

The shaft 27 of the turbine 6 extends beyond the turbine cylinder itself and is provided with a gear pinion 28 meshing with and driving a gear 29 and a gear 31. The gear 29 is secured on the shaft 32 which carries a governor 33 of the centrifugal weight-operated type. Excessive speeds of the turbine cause outward movement of the governor weights away from the turbine shaft axis and cause movement of a valve body 34 within a sleeve 36 by which the flow of oil under pressure through the sleeve is controlled in function of the speed. The position of sleeve 36 may be varied by rotation of a handwheel 37 geared therewith, thereby controlling the volume of fluid under pressure flowing therethrough, which controls the speed of the turbine, as will be described. It will be understood that a definite proportion of the oil under pressure in the entire control system is supplied to the governor and, therefore, flows through the sleeve 36.

The gear 31 drives a pump 38 of the meshing gear type, which draws oil from a reservoir 39 and discharges the oil, under pressure, into a chamber 41, from which a portion of the oil may flow through a port into the speed governor chamber or housing from which its discharge is controlled by valve 34 into a system of conduits while the remainder of the oil flows directly into the conduit system to be described hereinafter.

The turbine shaft 27 is provided with a safety regulator or emergency governor which comprises a piston or weight member 42, the center of gravity of which is not in the turbine shaft axis and which normally is held within a recess in the turbine shaft by spring 43 compressed between a portion of the recess wall and a disc 44 on the piston rod. The end of the piston is normally closely adjacent the surface of the shaft 27 and may move outward from the recess in the shaft into engagement with a pivoted tripping lever 46 of a starting arrangement which is, in effect, an oil relay. The oil relay includes a housing 47 having a plurality of passageways formed therethrough and containing a plurality of slotted or apertured sleeves 48 and 49 by which flow of a fluid under pressure, through the passageways in the housing, may be controlled. The position of sleeve 48 may be varied by rotation of a hand-wheel 51 having a worm formed on the spindle thereof which meshes with a worm gear 52 secured on the sleeve. The inner sleeve 49 extends downward through the housing 47 about a plunger rod 53 normally retained in its raised position by a spring 54 retained between a button top 56 on the rod and the housing 47. A spring 57 is arranged about the lower end of sleeve 49 and is secured between sleeves 48 and 49 and tends to bias sleeve 49 for rotation in one direction, which rotation is normally prevented only by engagement of lever 46 in a notch in the lower end of the sleeve. The lever 46 may be manually disengaged, by depression of plunger 53, from sleeve 49 whenever desired, as will be described hereinafter.

Chamber 41, receiving the oil discharged from pump 38, discharges the greater portion of the oil received therein into a pipe 59 connected with a pipe 60 which connects the inlet port of the oil relay and the main valve 8. The outlet port of the oil relay is connected with the valves 16, 17 and 18 by a pipe 61. The pressure of the oil in pipe 59 is increased by oil discharged thereinto from a turbine-driven auxiliary pump 62 drawing oil from the reservoir 39 and supplied with steam through a connection 63 from the main steam line 7 under the control of a valve 64.

Figure 5:
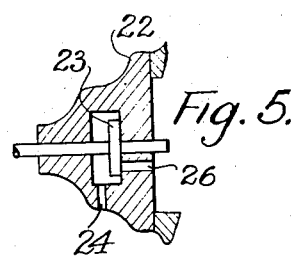
Fig. 5 is an enlarged, detail, fragmentary view, taken from Fig. 1.
Figure 3:
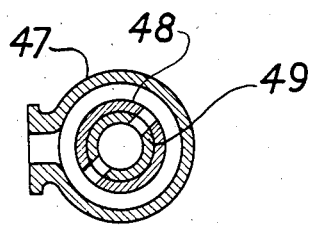
Fig. 3 is a horizontal section taken on the line A—A of Fig. 2.
Figure 4:
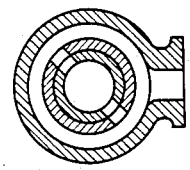
Fig. 4 is a horizontal section taken on the line B—B of Fig. 2.

Assuming that the turbine is at a standstill, valve 22 will be seated and collar 23 will shut off port 26 as shown in Fig. 5, valves 16, 17 and 18 will be closed, valve 34 will be retracted to the position shown, lever 46 will be engaged in the notch in the lower end of sleeve 49 and sleeves 48 and 49 will be in the relative position in which oil may flow from pressure lines 60 and 61 through the oil relay. The above position of the oil relay, therefore, permits discharge of the oil from under the pistons of the valves 8, 16, 17 and 18, under the action of the springs thereon, and permits the valves to close. The steam pressure in the supply line 7 then presses valve 22 tightly on its seat.

The turbine is put into operation by so rotating handwheel 51 as to turn sleeve 48 into a position in which the passageway to oil line 60, through the oil relay, is closed. The residual oil pressure in the pump and oil line leading therefrom hence increases the pressure in line 60, which slightly raises piston 19 of valve 8. Such slight raising of piston 19 raises collar 23 from port 26 and permits sufficient steam to flow from pipe 7 into steam chest 9 to equalize the pressure on both sides of the valve body 22. The oil flowing under piston 19 of valve 8 then needs to be at a pressure only sufficient to overcome the force of spring 21 to permit full opening of valve 8 so that the full steam pressure is thereupon admitted to steam chest 9, but the steam cannot escape therefrom for the reason that valves 16, 17 and 18 remain closed. Continued rotation of hand-wheel 51 causes such relative rotation of sleeves 48 and 49 as to open the passageway to line 61 and to valves 16, 17 and 18. The oil pressure is thus transmitted through line 61 to the pistons of valves 16, 17 and 18 which open in sequence, due to variation in their springs, and admit steam through pipes 11, 12 and 13 to the inlet ports of the turbine which begins to rotate.

As soon as the turbine has reached the upper limit of normal speed, the weights of the speed governor 33 are moved outwardly. Such movement of the governor weights causes retraction of valve 34, which permits a portion of the oil delivered to line 61 to discharge through sleeve 36 of the governor 33. The pressure of the oil under the pistons of valves 16, 17 and 18 is thus decreased, and the springs force the valves down until the oil pressure and spring force are again balanced. The turbine is thus maintained at the speed reached.

When the turbine is to be stopped slowly, i. e., by hand, the hand wheel 51 is turned in the reverse direction of rotation from that required above and the sequence of operations above given takes place in a reverse manner.

Figure 2:
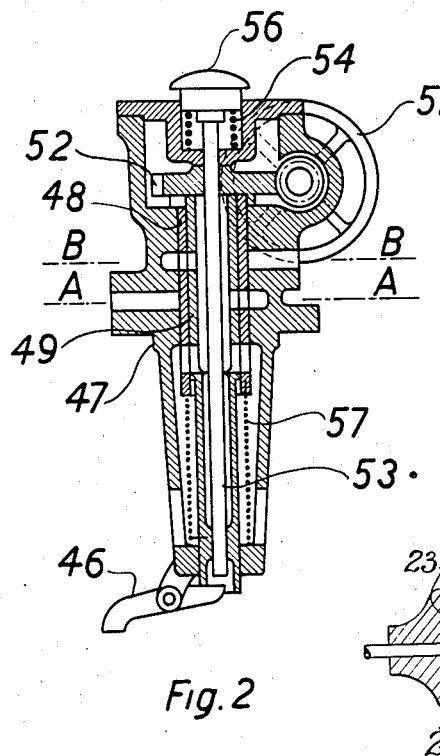
Fig. 2 is an enlarged vertical cross-section of a starting device to aid in controlling the valves of the governing system.

During the rotation of sleeve 49 by wheel 51, as above described, to start the turbine, spring 57, which is fastened between sleeves 48 and 49 as indicated in Fig. 2, is put under tension. Upon the occurrence of conditions, such as failure of the speed governor 33, insufficient action of the valve reseating springs or sticking of valves 16, 17 and 18, the turbine will exceed the predetermined speed limits and will reach a speed at which the emergency governor 42 will overcome the force of the spring 44 and will move outwardly from the surface of the turbine shaft 27. Such movement of emergency governor 42 will continue until contact is made with lever 46, which then disengages from sleeve 49. The sleeve is then rotated by the action of the stressed spring 57 and the oil pressure is quickly cut off from valves 16, 17 and 18 which are, accordingly, closed. The oil also discharges from line 60, and spring 21 forces piston 19 of valve 8 down, thereby forcing valve body 22 on its seat and causing collar 23 to close port 26 into steam chest 9.

When the turbine is to be stopped quickly by hand, pressure on button 56 depresses rod 53 against the force of spring 54 into contact with lever 46. The lever is disengaged from sleeve 49 and the same sequence of operation, as given immediately above, takes place to cause the turbine to stop.

Although but one embodiment of the present invention has been illustrated and described, it will be apparent to those skilled in the art that various changes and modifications may be made therein without departing from the spirit of the invention or from the scope of the appended claims.

The invention claimed is:

1. In a fluid-pressure-operated system for controlling the operation of a steam-driven prime mover, a steam-driven prime mover, a steam chest connected with said prime mover, regulating valves controlling the flow of steam from said steam chest to said prime mover, a main valve controlling the supply of steam to said steam chest, a pump driven by said prime mover and delivering a fluid under pressure, said valves being opened by fluid pressure supplied thereto from said pump, a fluid pressure relay, a fluid pressure connection to said relay for controlling the fluid pressure supply to said main valve, a second fluid pressure connection to said relay for controlling the fluid pressure supply to said regulating valves, means forming part of said relay and operable to open and close said connections successively, and a centrifugal governor connected with said prime mover, said relay and said governor cooperatively controlling the supply of fluid pressure to said regulating valves.

2. In a fluid-pressure operated system for controlling the operation of a steam-driven prime mover, a steam-driven prime mover, a pump driven by said prime mover and discharging a fluid under pressure, a steam chest connected with said prime mover, fluid-pressure opened regulating valves operable in a predetermined sequence and controlling the supply of steam from said steam chest to said prime mover, a fluid-pressure opened main valve controlling the supply of steam to said chest, said main valve having controlled ports therethrough to permit equalization of the pressure thereon, a fluid pressure relay controlling the opening of said main valve, a speed governor connected with said prime mover and cooperating with said fluid relay to open said regulating valves, said speed governor retaining said regulating valves in open position dependent on the speed of said prime mover, and an emergency governor cooperating with said relay to cause quick closing of all of said valves, said relay being manually operable to vary the opening time of said regulating valves and to cause quick closing thereof.

3. In a control system for a prime mover, a main supply valve, a speed-regulating valve, and means for controlling said valves; said means including complementary sleeve valves fitted one within the other and relatively rotatable about their common axis to a given relative position to effect opening of said main and speed-regulating valves and to a different relative position to effect closing of said main and speed-regulating valves, spring means tensioned during relative movement of said parts to the valve-opening position and operable when so tensioned to bias said parts to the valve-closing position, means for locking said sleeve valves in the valve-opening position with said spring means tensioned, and means responsive to a predetermined speed condition of said prime mover and operable at said condition to release said locking means.

4. In a control system for a prime mover, a main supply valve, a speed-regulating valve, a first fluid pressure connection for controlling opening and closing of said main valve, a second fluid pressure connection for controlling opening and closing of said speed-regulating valve, and means common to said connections and having a given range of operating movement and operable upon such movement to effect actuation of said valves successively.

5. In a control system for a prime mover, a main supply valve, a speed-regulating valve, a first fluid pressure connection for controlling opening and closing of said main valve, a second fluid pressure connection for controlling opening and closing of said speed-regulating valve, and means common to said connections and having a given range of operating movement and operable upon such movement to effect actuation of said valves successively, said common means including complementary parts relatively movable with respect to each other and spring means for biasing said parts to a given relative position whereat said common means effects closing of said valves.

PAUL FABER.